(12) United States Patent
Wiegman et al.

(10) Patent No.: US 11,855,302 B1
(45) Date of Patent: Dec. 26, 2023

(54) VENTING APPARATUS FOR BATTERY EJECTA FOR USE IN AN ELECTRIC AIRCRAFT

(71) Applicant: BETA AIR, LLC, South Burlington, VT (US)

(72) Inventors: Nathan William Joseph Wiegman, Williston, VT (US); Tyler John Skroski, Burlington, VT (US); Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/826,798

(22) Filed: May 27, 2022

(51) Int. Cl.
*H01M 50/317* (2021.01)
*B64C 29/00* (2006.01)
(Continued)

(52) U.S. Cl.
CPC ....... *H01M 50/317* (2021.01); *B64C 29/0008* (2013.01); *B64D 33/08* (2013.01); *H01M 10/482* (2013.01); *H01M 10/486* (2013.01); *H01M 10/613* (2015.04); *H01M 10/625* (2015.04); *H01M 10/63* (2015.04); *H01M 10/6566* (2015.04); *H01M 50/204* (2021.01); *H01M 50/249* (2021.01); *H01M 50/293* (2021.01); *H01M 2220/20* (2013.01)

(58) Field of Classification Search
CPC ............. H01M 50/317; H01M 50/249; H01M 50/293; H01M 50/204; H01M 10/613; H01M 10/625; H01M 10/63; H01M 10/6566; H01M 10/482; H01M 10/486
See application file for complete search history.

(56) References Cited

U.S. PATENT DOCUMENTS

| 9,660,237 B2 | 5/2017 | Dekeuster et al. |
| 9,663,233 B2 | 5/2017 | Plessner et al. |

(Continued)

FOREIGN PATENT DOCUMENTS

| CN | 109390519 A | * | 2/2019 |
| CN | 111252256 | | 6/2020 |

(Continued)

OTHER PUBLICATIONS

Mark H. Shushnar; A Battery Electric Aircraft Feasibility Investigation Including a Battery-in-Wing Conceptual Design; Jun. 2014.

*Primary Examiner* — Jimmy Vo
(74) *Attorney, Agent, or Firm* — CALDWELL INTELLECTUAL PROPERTY LAW

(57) ABSTRACT

An apparatus for venting battery ejecta for use in an electric aircraft is presented. The apparatus includes a battery module with a plurality of electrochemical cells. The electrochemical cells of the plurality of electrochemical cells are separated by a carbon fiber barrier. Venting port of a plurality of venting ports is configured to vent an electrochemical cell of the plurality of electrochemical cells using a venting path of a plurality of venting paths, wherein the plurality of vent ports is fluidly connected to the plurality of venting paths and the plurality of venting paths are fluidly connected to at least an outlet. Venting paths direct the battery ejecta from the electrochemical cell to the outside of the electric aircraft through at least an outlet.

20 Claims, 7 Drawing Sheets

(51) Int. Cl.
*B64D 33/08* (2006.01)
*H01M 50/204* (2021.01)
*H01M 50/293* (2021.01)
*H01M 50/249* (2021.01)
*H01M 10/625* (2014.01)
*H01M 10/63* (2014.01)
*H01M 10/6566* (2014.01)
*H01M 10/48* (2006.01)
*H01M 10/613* (2014.01)

(56) References Cited

U.S. PATENT DOCUMENTS

| | | | |
|---|---|---|---|
| 9,845,158 | B2 | 12/2017 | Liske et al. |
| 10,777,861 | B2 | 9/2020 | Halsey et al. |
| 10,854,866 | B2 | 12/2020 | Demont et al. |
| 2008/0297103 | A1* | 12/2008 | Windsor ............... H01M 50/20 361/601 |
| 2011/0003185 | A1* | 1/2011 | Kritzer ............... H01M 50/293 429/120 |
| 2015/0162582 | A1 | 6/2015 | Metz et al. |
| 2015/0325827 | A1 | 11/2015 | Dittmar et al. |
| 2018/0019476 | A1* | 1/2018 | Qiao ................ H01M 50/581 |
| 2020/0140103 | A1 | 5/2020 | Halverson |
| 2020/0277062 | A1 | 9/2020 | Becker et al. |
| 2020/0328389 | A1 | 10/2020 | Lloyd |
| 2021/0184290 | A1 | 6/2021 | Sweet et al. |
| 2021/0391627 | A1 | 12/2021 | Villanueva et al. |
| 2022/0021068 | A1 | 1/2022 | Zeng et al. |

FOREIGN PATENT DOCUMENTS

| | | |
|---|---|---|
| DE | 4407156 C1 * | 6/1995 |
| DE | 102008046744 A1 * | 4/2009 |
| FR | 3085546 | 3/2020 |
| WO | WO-2007043510 A1 * | 4/2007 |
| WO | WO-2020003181 A1 * | 1/2020 |
| WO | WO-2021034420 A1 * | 2/2021 |

* cited by examiner

VENTING APPARATUS FOR BATTERY EJECTA FOR USE IN AN ELECTRIC AIRCRAFT

FIELD OF THE INVENTION

The present invention generally relates to the field of electric aircraft. In particular, the present invention is directed to a venting assembly for battery ejecta in an electric aircraft.

BACKGROUND

Electric aircrafts include batteries to operate. Batteries are prone to overheating during flight, charging, or other operations. Modern ventilation systems are inefficient at reducing temperatures of batteries and can be improved.

SUMMARY OF THE DISCLOSURE

In an aspect, a venting assembly for battery ejecta for use in an electric aircraft includes: a battery module; a plurality of electrochemical cells in the battery module, wherein the plurality of electrochemical cells is separated by a carbon fiber barrier; a plurality of vent ports configured to vent the plurality of electrochemical cells using a plurality of venting paths, wherein the plurality of vent ports are fluidly connected to the plurality of venting paths and the plurality of venting paths are fluidly connected to at least an outlet, and an outlet outside of the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For illustrating the invention, the drawings show aspects of one or more embodiments of the invention. However, the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an electric aircraft with a venting assembly for battery ejecta. Aspects of the present disclosure may include a battery module designed to power the electric aircraft. Aspects of the present disclosure may also include a plurality of venting ports attached to a plurality of venting paths designed to vent the battery ejecta from the electric aircraft to the outside through at least an outlet. A plurality of venting paths may be used due to the high temperatures of the battery ejecta. The plurality of venting paths and venting ports allow the ejecta to vent without increasing pressure in the battery module or causing a cascading thermal runaway.

Figure 1:
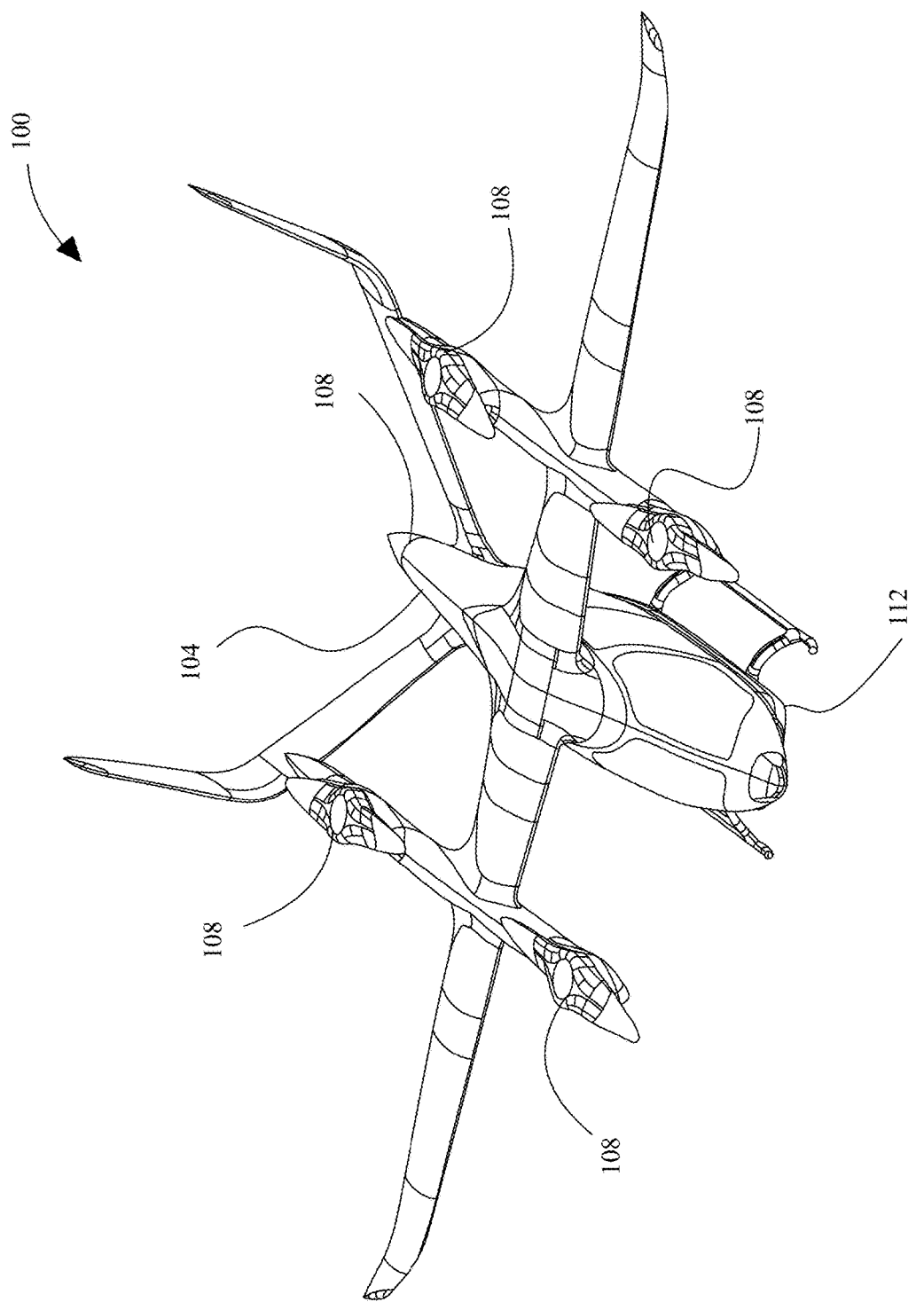
FIG. 1 is a diagrammatic representation of an exemplary embodiment of an electric aircraft.

Referring now to FIG. 1, an exemplary embodiment of an electric aircraft 100 (also referred to herein as "aircraft") is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. In embodiments, electric aircraft 100 may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may include differing and/or similar cross-sectional geometries over its cord length or the length from wing tip to where wing meets aircraft's body. One or more wings may be symmetrical about aircraft's longitudinal plane, which includes the longitudinal or roll axis reaching down the center of aircraft through the nose and empennage, and plane's yaw axis. Laterally extending element may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source 112. An energy source 112 may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source 112 may also include a battery cell, or a plurality of battery cells connected in series into a pack and each pack connected in series or in parallel with other packs. Configuration of an energy source 112 containing connected packs may be designed to meet an energy or power requirement and may be designed to fit within a designated footprint in an electric aircraft in which aircraft 100 may be incorporated. Energy source 112 may be located as a pack at the bottom of the aircraft 100, shown in FIG. 1.

In an embodiment, and still referring to FIG. 1, an energy source 112 may be used to provide a steady supply of electrical power to a load over the course of a flight by a vehicle or other electric aircraft. For example, the energy source 112 may be capable of providing sufficient power for "cruising" and other relatively low-energy phases of flight. An energy source 112 may also be capable of providing electrical power for some higher-power phases of flight as well, particularly when the energy source 112 is at a high state of charge, as may be the case for instance during takeoff. In an embodiment, the energy source 112 may be capable of providing sufficient electrical power for auxiliary loads including without limitation, lighting, navigation, communications, de-icing, steering or other systems requiring power or energy. Further, the energy source 112 may be capable of providing sufficient power for controlled descent and landing protocols, including, without limitation, hovering descent or runway landing. As used herein the energy source 112 may have high power density where the electrical power an energy source 112 can usefully produce per unit of volume and/or mass is relatively high. The electrical power is defined as the rate of electrical energy per unit time. An energy source 112 may include a device for which power that may be produced per unit of volume and/or mass has been optimized, at the expense of the maximal total specific energy density or power capacity, during design. Non-limiting examples of items that may be used as at least an energy source 112 may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source 112 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source 112.

Still referring to FIG. 1, an energy source 112 may include a plurality of energy sources, referred to herein as a pack of energy sources. The pack may include batteries connected in parallel or in series or a plurality of packs connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the pack and reduce the overall power output as the voltage of the pack may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source 112 includes a plurality of battery cells, the overall power output capacity may be dependent on the electrical parameters of each individual cell. If one cell experiences high self-discharge during demand, power drawn from at least an energy source 112 may be decreased to avoid damage to the weakest cell. The energy source 112 may further include, without limitation, wiring, conduit, housing, cooling system and battery management system. Persons skilled in the art will be aware, after reviewing the entirety of this disclosure, of many different components of an energy source 112.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2:
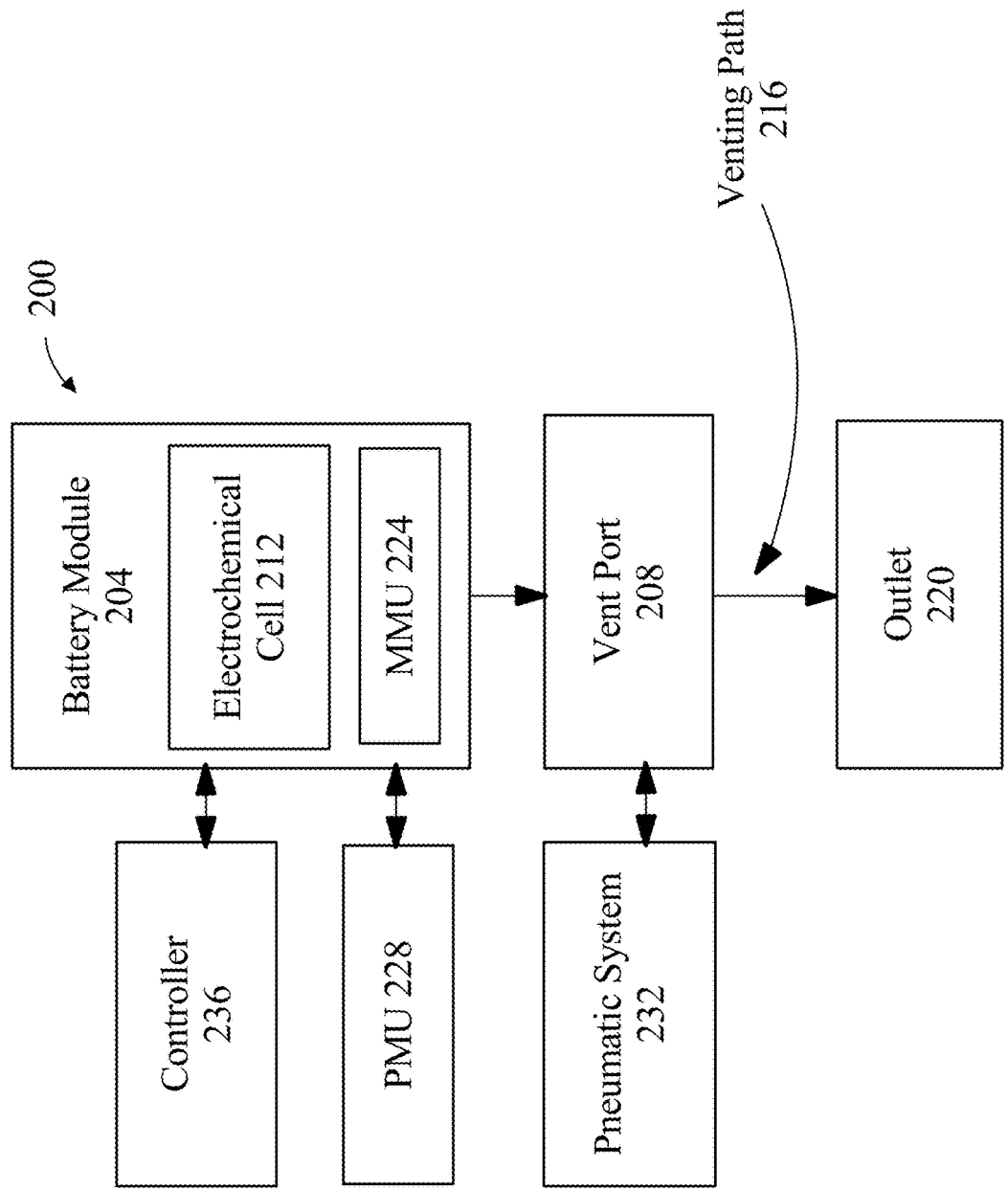
FIG. 2 illustrates a block diagram of an exemplary embodiment of a venting apparatus for battery ejecta.

Referring now to FIG. 2, a block diagram of an exemplary embodiment of a venting apparatus 200 for battery ejecta in an electric aircraft. In this disclosure, a "venting assembly" is a system configured to vent ejecta from the aircraft. Venting apparatus 200 includes a battery module 204, an electrochemical cell 212 of a plurality of electrochemical cells within the battery module 204, a vent port 208 of a plurality of vent ports configured to vent the electrochemical cell 212 through a venting path 216 of a plurality of venting paths, and an outlet 220 to vent ejecta to the outside of the electric aircraft. A battery module 204 may be an energy source and a battery pack may be a pack of energy sources. Venting assembly may be any of the systems described in in U.S. Nonprovisional application Ser. No. 17/732,648, filed on Apr. 29, 2022, and entitled "SYSTEM AND METHOD FOR AUTOMATIC PRECONDITIONING OF A BATTERY PACK", the entirety of which is incorporated herein by reference.

Still referring to FIG. 2, venting apparatus 200 includes a battery module 204 configured to power electric aircraft 100. Apparatus 200 may include a plurality of battery modules 204 to power electric aircraft 100. A "battery module," as used in this disclosure, is a battery unit that contains a plurality of battery cells that have been wired together in series, parallel, or a combination of series and parallel, wherein the "battery module" holds the battery cells in a fixed position. For instance and without limitation, battery module 204 may be consistent with any battery module disclosed in U.S. application Ser. No. 17/404,500 filed on Aug. 17, 2021 and entitled, "STACK BATTERY PACK FOR ELECTRIC VERTICAL TAKE-OFF AND LANDING AIRCRAFT," which is incorporated by reference herein in its entirety. A plurality of battery modules 204 may be housed within a battery pack. The plurality of battery modules may be housed within a battery pack. A "battery pack," as used in this is an energy storage device that includes a plurality of battery modules. Persons skilled in the art, upon reviewing the entirety of this disclosure, will be aware of the various embodiments of an energy storage device in the context of housing a plurality of individual battery modules. A battery module 204 includes a plurality of electrochemical cells. For the purposes of this disclosure, an "electrochemical cell" is a device capable of generating electrical energy from chemical reactions or using electrical energy to cause chemical reactions. An electrochemical cell 212 may also be referred to as a 'battery cell' in this disclosure. Further, voltaic or galvanic cells are electrochemical cells that generate electric current from chemical reactions, while electrolytic cells generate chemical reactions via electrolysis. In some embodiments, battery module 204 may include cylindrical battery cells. For the purposes of this disclosure, cylindrical battery cells are round battery cells that have a larger height than diameter. In some embodiments, battery module 204 may include a pouch cell. As used in this disclosure, "pouch cell" is any battery cell or module that includes a pocket. In some cases, a pouch cell may include or be referred to as a prismatic pouch cell. A prismatic pouch cell may be a stack of pouch cells encased in a semi-hard plastic case. In some cases, a pouch cell may include a pouch which is substantially flexible. Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

Still referring to FIG. 2, plurality of battery cells may include without limitation Li ion batteries which may include NCA, NMC, Lithium iron phosphate (LiFePO4). Additionally battery cells may include Lithium Manganese Oxide (LMO) batteries, which may be mixed with another cathode chemistry to provide more specific power if the application requires Li metal batteries, which have a lithium metal anode that provides high power on demand. Additionally, battery cells may include Li ion batteries that have a silicon or titanite anode. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. In some embodiments, the plurality of battery cells may include lithium metal batteries. Persons skilled in the art, upon reviewing the entirety of this disclosure, will be aware of various devices of components that may be used as an electrochemical cell 212.

Plurality of battery cells may be configured to be connected in series, parallel, and/or a combination thereof. These cells may utilize electrochemical cells, galvanic cells, electrolytic cells, fuel cells, flow cells, and/or voltaic cells. In general, an electrochemical cell 212 is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that do not include wires may be prefabricated terminals of a first gender that mate with a second terminal with a second gender. Plurality of battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Plurality of battery cells may be wired in a series-parallel circuit which combines characteristics of the constituent circuit types to this combination circuit. Plurality of battery cells may be electrically connected in a virtually unlimited arrangement which may confer onto the system the electrical advantages associated with that arrangement such as high-voltage applications, high-current applications, or the like. In an exemplary embodiment, battery module 204 many include 196 battery cells in series and 18 battery cells in parallel. This is, as someone of ordinary skill in the art would appreciate, is only an example and battery module 204 may be configured to have a near limitless arrangement of battery cell configurations. Battery module 204 may also include a side wall which includes a laminate of a plurality of layers configured to thermally insulate the plurality of battery cells from external components of the battery module 204. Side wall layers may include materials which possess characteristics suitable for thermal insulation as described in the entirety of this disclosure like fiberglass, air, iron fibers, polystyrene foam, and thin plastic films, to name a few. Side wall may additionally or alternatively electrically insulate the plurality of battery cells from external components of battery pack and the layers of which may include polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may include a feature for alignment and coupling to center sheet. This feature may include a cutout, slots, holes, bosses, ridges, channels, and/or other undisclosed mechanical features, alone or in combination. There may be a combination of a plurality of battery modules utilized to power the electric aircraft. Battery module 204 may be configured to provide electrical power to the at least a propulsion component. Persons skilled in the art will be aware, after reviewing the entirety of this disclosure, of many different components of a battery module 204 and energy source. Exemplary energy sources are disclosed in detail in U.S. patent application Ser. No. 16/948,157, filed Sep. 4, 2020, and entitled "SYSTEM AND METHOD FOR HIGH ENERGY DENSITY BATTERY MODULE." Furthermore, exemplary energy sources are also disclosed in detail in U.S. patent application Ser. No. 16/948,140, filed Sep. 4, 2020, and entitled "SYSTEM AND METHOD FOR HIGH ENERGY DENSITY BATTERY MODULE," which is incorporated in its entirety herein by reference.

Electrochemical cells of the plurality of electrochemical cells are separated by a carbon fiber barrier. In an embodiment, each electrochemical cell may be arranged such that a side of a electrochemical cell 212 may be in contact with a side of an adjacent battery cell. Alternatively, electrochemical cells may be separated from one or more other electrochemical cells using a barrier, such as carbon fiber or stainless steel. Barrier may prevent thermal runaway, battery eject, or the like from spreading between battery cells creating a cascading event. Carbon fiber or stainless steel are favorable materials over plastics, aluminum, titanium, or the like, due to their high thermal resistance. In an embodiment, thermal runaway temperatures for lithium-metal battery cells are ~1600 C. Thermal runaway temperatures for lithium-ion battery cells are ~800 C. Lithium-metal battery cells have a significantly higher thermal runway temperature, therefore requiring a more thermal resistant barrier between cells. A "thermal runaway," as used in this disclosure is the event in which heat generated within a battery module 204 exceeds the amount of heat that is dissipated to its surroundings. In a non-limiting embodiment, the thermal runaway may include a chain reaction/cascading event within battery module 204.

Still referring to FIG. 2, venting apparatus 200 includes a vent port 208 of a plurality of vent ports. Each vent port 208 of a plurality of vent ports is configured to vent an electrochemical cell 212 of a plurality of electrochemical cells. Each electrochemical cell 212 is configured to include a vent port 208, which is configured to provide an opening for battery ejecta to escape from each electrochemical cell 212. Vent port 208 may provide a fluid connection between an electrochemical cell 212 and venting path 216. A "vent port" as used in this disclosure is an opening configured to allow a medium to pass through. In some embodiments, a vent port 208 may include, but is not limited to, a flap, a door, a hole, and the like. Additionally, vent port 208 may be composed of a temperature-resistant material, such that the vent port 208 and/or conduit may be capable of withstanding battery ejecta produced by an electrochemical cell 212, such as a lithium-metal cell. In other embodiments, vent port 208 may include openings such as holes, slits, or other openings. Vent port 208 may include a terminal, valve, opening, door, or the like. In an embodiment, venting port may include a check valve. In this disclosure, a "check valve" is a valve that closes to prevent backward flow of liquid. Vent port 208 may be configured to open and expose the electrochemical cell 212 to a venting path 216 in the event of a thermal runaway. Vent port may create a fluid connection between the electrochemical cell 212 and the venting path 216. Vent port 208 may be configured to passively open in the event of a thermal runaway. In an embodiment, vent port 208 may be composed of a low temperature resistant material, such as plastic, aluminum, or the like, which may be consumed by battery ejecta during thermal runaway events. In other embodiments, vent port 208 may be electronically configured to detect a thermal runaway and open to allow battery ejecta to exit the aircraft. A "battery ejecta," as used in this disclosure, is any material that is forced or thrown out of a battery module 204 as a result of a thermal runaway event. Vent port 208 may include temperature sensors, motion sensors, or the like to detect a thermal runaway event. Vent port 208 may be communicatively connected to a flight controller, discussed in further detail below, that may control the opening and closing of the vent port 208.

Figure 3:
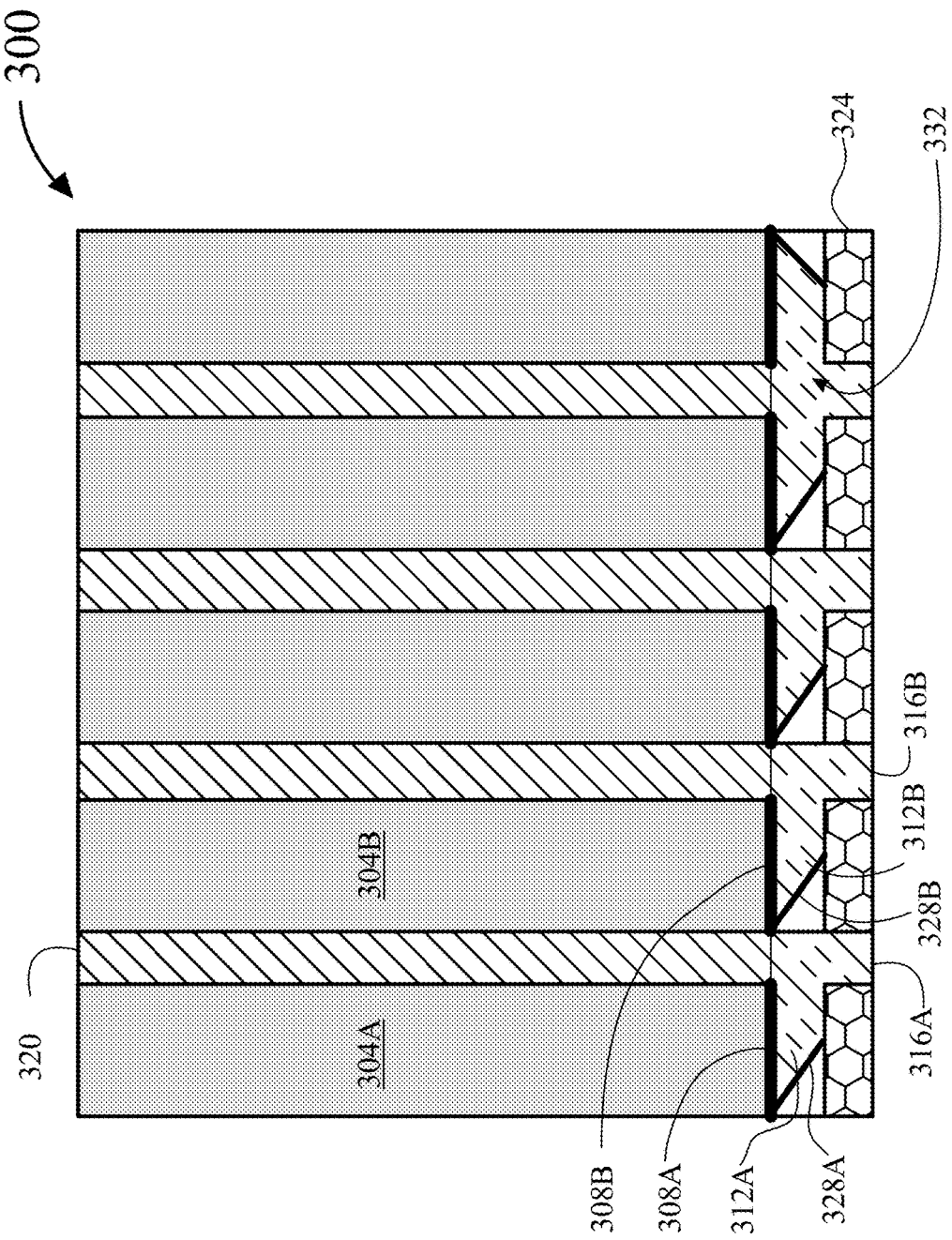
FIG. 3 is an illustration of an exemplary embodiment battery module with venting paths.

Continuing to reference FIG. 2, vent port 208 of a plurality of vent ports is configured to vent an electrochemical cell 212 of the plurality of electrochemical cells one or more venting paths. A "venting path" as used in this disclosure is any device capable of directing a flow of a fluid such as battery ejecta. In some embodiments, venting path 216 may include a metallic, polymer, or other component. In some embodiments, venting path 216 may include a cross-sectional shape. The cross-sectional shape may include, but is not limited to, a rectangle, square, triangle, circle, hexagon, prism, or other shapes. In some embodiments, venting path 216 may include a curved structure. In some embodiments, venting path 216 may include a smooth surface. Venting path 216 may include a uniform structure. In some embodiments, venting path 216 may include a conduit. A "conduit" is a channel or tube for carrying a fluid. Conduit may be shared amongst a plurality of battery cells within a battery module. In an embodiment, two battery cells may vent ejecta to the same conduit through the vent ports. In the case where there is one conduit for two battery cells, battery cells may also share an outlet. FIG. 3 shows two battery cells that share one conduit. Alternatively, each battery module 204 or electrochemical cell 212 within battery module 204 may have their own conduit. Additionally, venting path 216 may be composed of a temperature-resistant material, such that the venting path 216 and/or conduit may be capable of withstanding battery ejecta produced by an electrochemical cell 212, such as a lithium-metal cell. As a non-limiting example, venting path 216 may be composed of carbon fiber. As another non-limiting example, venting path 216 may be composed of stainless steel. Venting path 216 may include deflectors to direct battery ejecta away from battery modules. Deflectors and venting path 216 may be directed downward of the electric aircraft 100 and away from the passengers seated in the body of the electric aircraft. As used herein, a "body of the electric aircraft" carries the payload of the aircraft. A body of the electric aircraft may include a cabin, which is located within the fuselage. As used herein, a "deflector" is a device that alters the direction of flow of a fluid. For example, a deflector may include fins, plates, or other objects that direct the flow of battery ejecta. Deflector may be composed of any material capable of withstanding temperatures up to 1600 C such as ceramics, carbon fiber, stainless steel, etc. The venting path 216 may have a variety of profiles. In some embodiments, the venting path 216 may be designed such that the battery ejecta and other fluid transits vent conduit using the force of gravity. In some embodiments, the venting path 216 may be linear and decreasing. In some embodiments, the venting path 216 may have multiple different slopes. As a non-limiting example, the venting path 216 may have a first section with a greater negative slope and a second section with a smaller negative slope. In some embodiments, the venting path 216 may be concave. In some embodiments, the venting path 216 may be convex. In some embodiments, the venting path 216 may be vertical. Alternatively or additionally, vent conduit may include a container configured to house battery module 204. One of ordinary skill in the art, having reviewed the entirety of this disclosure, would appreciate that a variety of the venting path 216 are possible.

Continuing to reference FIG. 2, venting path 216 of a plurality of venting paths may include a crush zone. As used herein, a "crush zone" is a region of a vehicle that is designed to minimize forces to the objects adjacent to the crush zone. In an embodiment, crush zone may minimize forces to a battery module 204 if the crush zone is located between the battery module 204 and the object that created the forces (i.e. the ground). Battery modules, vents, and vent paths may be placed at the bottom of an aircraft. In the case of an emergency, a crush zone may cushion the impact from the ground and another object and protect the battery modules from thermal runaway events. Crush zone may be located between the exterior of the aircraft and the battery modules. Venting paths 216 may run through and/or around the crush zone. Crush zone may include material arranged in a honeycomb pattern designed to minimize forces from other objects. Crush zone may be made of any suitable materials such as aluminum, titanium, carbon fiber, plastics, or the like.

Continuing to refer to FIG. 2, each vent port 208 of the plurality of vent ports may be oriented at a plurality of angles as a function of the venting path 216. Plurality of angle may include 45 degrees, 30 degrees, 70 degrees, 120 degrees, or the like. Maneuvering the plurality of vent ports may involve a pneumatic system 232. In this disclosure, a "pneumatic system" is a collection of interconnected components using compressed air to do work for automated equipment. One of these components may be an actuator; an "actuator" as used in this disclosure is a device that converts a signal into mechanical and/or electromechanical motion. In some embodiments, the actuator may include, but is not limited to, pneumatic, hydraulic, mechanical, and/or an electronic actuator. Actuator may include an electronically actuated device such as, but not limited to, a servo, an electromotor, and the like. A controller 236 (e.g. a flight controller) may command the actuator to control a venting path 216 of one or more vent ports. Flight controller is further explained below. Actuator may be configured to increase and/or decrease a size of a venting path 216 associated with a vent port 208. In some embodiments, actuator may be configured to direct a flow of air through a venting path 216. In some embodiments, actuator may adjust an angle and/or orientation of a venting path 216. In a non-limiting example, actuator may adjust an angle of a plurality of venting paths which may direct a heated air away from the battery module 204. In another non-limiting example, actuator may reduce a diameter of a venting path 216 which may prevent external elements from contacting the electrochemical cells. In some embodiments, each vent port 208 of plurality of vent ports may include an actuator. In some embodiments, actuator may adjust a venting path 216 of each vent port 208 of plurality of vent ports individually. In other embodiments, actuator may adjust a plurality of venting paths. Each vent port 208 of a plurality of vent ports may be paired to each electrochemical cell 212 of plurality of electrochemical cells. In some embodiments, plurality of vent ports may be positioned underneath plurality of electrochemical cells. In some embodiments, plurality of vent ports may be positioned above, behind, and/or at a side of plurality of electrochemical cells. In some embodiments, plurality of vent ports may include an orientation. An "orientation" as used in this disclosure is any direction, rotation, and/or or angle of an object. In some embodiments, each vent port 208 of the plurality of vent ports may include a similar orientation. In other embodiments, each vent port 208 of the plurality of vent ports may have an orientation different from one another. In some embodiments, plurality of vent ports may include a moveable component. A "moveable component" as used in this disclosure is any device capable of changing a position. In some embodiments, a moveable component may include, but is not limited to, a motor, actuator, and the like. A motor may include an electromechanical motor, servo motor, or other motors. An actuator may include a hydraulic, pneumatic, electric, and/or another actuator. In some embodiments, each vent port 208 of plurality of vent ports may include an individual movable component. An individual movable component may be configured to adjust a vent port 208 of a plurality of vent ports separately from other vent ports. Plurality of vent ports and preconditioning system may be any of the systems described in in U.S. Nonprovisional application Ser. No. 17/527,272, filed on Nov. 16, 2021, and entitled "SYSTEM AND METHOD FOR BATTERY VENTILATION OF AN ELECTRIC AIRCRAFT", the entirety of which is incorporated herein by reference.

With continued reference to FIG. 2, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 2, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 2, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 2, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 2, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Referring still to FIG. 2, venting apparatus 200 further includes at least an outlet 220 in fluidic communication with the plurality of vent ports and the plurality of vent paths. An "outlet" as used in this disclosure, is an opening through which material carried by a vent path can exit a device. A device may be the electric aircraft 100. An at least an outlet 220 may allow for battery ejecta to flow from the plurality of electrochemical cells to outside of electric aircraft 100, which may reduce a temperature of the batter module. In some embodiments, an at least an outlet 220 may allow for heated air to flow away from the battery module 204 and the passengers sitting above the battery pack. At least an outlet 220 may be connected to the plurality of vent ports by a venting path 216 as explained above. Battery ejecta may travel through venting path 216 to get to at least an outlet 220 where it escapes from electric aircraft 100. At least an outlet 220 may be configured direct battery ejecta substantially in a direction that avoids the aircraft and a passenger compartment of the aircraft. In some cases, the at least an outlet 220 may be located at the bottom of the electric aircraft 100 and may expel battery ejecta down through the bottom of the electric aircraft.

Continuously referring to FIG. 2, at least an outlet 220 may be on an opposite side of electric aircraft 100 as an egress. In this disclosure, an "egress" is an exit located on the aircraft. Egress may be a passenger egress, meaning it is an exit for the passengers located in the passenger compartment of aircraft 100. In an embodiment, egress may be a door, window, or the like as long as an exit from the aircraft is provided. In some cases, electric aircraft 100 may have an egress substantially on one side and the plurality of vents 208 may be located on a side opposite that of the egress.

Still referring to FIG. 2, venting apparatus 200 may further include a flight controller. Flight controller may be, including combinational or sequential logic circuits, analog circuits, ASICs, FPGAs, and/or computing devices. Flight controller may adjust plurality of vent ports which may adjust a plurality of venting paths of a battery module 204. Flight controller may control individually maneuverable components of the vent ports. In some embodiments, controller may adjust plurality of vent ports to allow a venting path 216 throughout each battery cell of plurality of electrochemical cells. In some embodiments, flight controller may adjust a vent port 208 of plurality of vent ports to cool an individual cell of plurality of electrochemical cells. "Cooling" of the battery module 204 occurs when battery ejecta is removed through the venting paths. Controller may include a flight controller as described below with reference to FIG. 4. Moreover, each battery module 204 and/or vent port 208 may further includes a temperature sensor communicatively connected to the flight controller. As used in this disclosure a "sensor" is a device, module, and/or subsystem, utilizing any hardware, software, and/or any combination thereof to detect events and/or changes in the instant environment and transmit the information; transmission may include transmission of any wired or wireless electronic signal. Temperature sensor may be attached, mechanically coupled, and/or communicatively coupled, as described above, to vehicle. Temperature sensor may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present, may be measured in Fahrenheit (° F.), Celsius (° C.), Kelvin (° K), or another scale alone or in combination. A temperature measured by sensors may include electrical signals which are transmitted to their appropriate destination wireless or through a wired connection to the controller. Temperature sensor may be configured to detect a temperature datum of its respective electrochemical cell 212 of the plurality of electrochemical cells. Temperature sensor is configured to then transmit the temperature datum to the flight controller, which is then configured to initiate maneuvering of the plurality of vent ports as a function of the temperature datum.

With continued reference to FIG. 2, the sensor may transduce a detected phenomenon, such as without limitation, temperature, voltage, current, pressure, and the like, into a sensed signal. The sensor may include a module monitor unit (MMU). A "module monitor unit," as used in this disclosure, is a sensing device configured to detect a plurality of inputs and/or phenomenon of the MMU 224. For instance and without limitation, MMU 224 may be consistent with the MMU in U.S. patent application Ser. No. 17/529,447 and entitled, "MODULE MONITOR UNIT FOR AN ELECTRIC AIRCRAFT BATTERY PACK AND METHODS OF USE," which is incorporated by reference herein in its entirety. Each battery module 204 of the plurality of battery modules may include MMU 224. In a non-limiting embodiment, MMU 224 may be configured to detect a measured battery data and generate a thermal datum as a function of the measured battery data. A "measured battery data," as used in this disclosure, is any thermal parameter and/or battery parameter related to battery module 204. For example and without limitation, the measured battery data may include voltage ratings, capacity ratings, state of charge (SoC) and/or battery state of charge (BSoC), depth of discharge (DoD), charging and discharging rates, charging and discharging regimes, and the like thereof. A "thermal datum," as used in this disclosure, is a collection of data that translates the measured battery data into electrical signals comprising of information describing a battery module 204 in at least a readable form. Alternatively or additionally, any datum captured by any sensor may include circuitry, computing devices, electronic components or a combination thereof that translates into at least an electronic signal configured to be transmitted to another electronic component.

Alternatively or additionally, the sensor may include one or more pack monitor units (PMU) 228. A "pack monitor unit," as used in this disclosure, is a device used to measure the parameters of the plurality of battery modules in a battery pack. For instance and without limitation, the PMU 228 may be consistent with the PMU in U.S. patent application Ser. No. 17/529,583 and entitled, "PACK MONITORING UNIT FOR AN ELECTRIC AIRCRAFT BATTERY PACK AND METHODS OF USE FOR BATTERY MANAGEMENT," or U.S. patent application Ser. No. 17/529,44, the entirety of both applications is hereby incorporated by reference. In a non-limiting embodiment, the battery pack may include two PMUs. Each PMU may be configured to measure a battery pack datum. A "battery pack datum," for the purpose of this disclosure, is a collection of information describing one or more characteristics corresponding to at least a portion of a battery pack of an electric aircraft. For instance and without limitation, the battery pack datum may be consistent with the battery pack datum in U.S. patent application Ser. No. 17/515,458 and entitled, "SYSTEM AND METHOD FOR MANAGING RESIDUAL ENERGY FOR AN ELECTRIC AIRCRAFT," which is incorporated by reference herein in its entirety. In a non-limiting embodiment, PMUs may be configured to measure the battery pack and/or the plurality of battery modules, wherein each PMU 228 generates its own battery pack datum. For instance, a first PMU may be triggered to measure the battery pack and generate a battery pack datum. A second PMU may be triggered to measure the battery pack and generate a battery pack datum after some time interval such as 5 milliseconds. This is so, at least in part, for some computing device to detect any discrepancies between the battery pack datums of a first and second PMU. In some embodiments, a discrepancy may indicate some thermal event. Persons skilled in the art, upon reviewing the entirety of this disclosure, will be aware of measuring the data of the same battery multiple times in the context of detecting discrepancies and thermal events.

Still referring to FIG. 2, battery module 204 may include two MMUs, wherein each MMU 224 is configured to detect and/or measure the same data and/or parameters of battery module 204, but in different instances. For example and without limitation, one MMU may be triggered to measure data of battery module 204 and the other MMU may be triggered to measure data of the same battery module 204 after some time interval, wherein the time interval may include short bursts of time such as 5 milliseconds. This is so, at least in a part, for some computing device to compare the data measured by the two MMUs. For instance, ideally, the data measured by the two MMUs may be identical or expectedly similar. Any significant change in data may indicate a thermal event. A "thermal event," as used in this disclosure, is a chemical reaction indicating a substantial rise or acceleration in the increase of temperature of a battery module 204. In a non-limiting embodiment, the thermal event may include, but not limited to, a thermal runaway, a short circuit, leakage of gas and/or chemicals, and the like thereof. Alternatively or additionally, the thermal event may include an indication of a thermal event. In a non-limiting embodiment, the thermal runaway may include a chain reaction within battery module 204.

Referring now to FIG. 3, diagram of a battery module 300 including multiple electrochemical cells and multiple venting paths is shown. Battery module 300 may include a first electrochemical cell 304A with a first vent port 308A, and a first vent path 312A, and a first vent outlet 316A. Additionally, battery module 300 may include a second electrochemical cell 304B, with a second vent port 308B, and a second vent path 312B, and a second vent outlet 316B. First electrochemical cell 304A and second electrochemical cell 304B may be consistent with any electrochemical cell as part of this disclosure. First vent port 308A and second vent port 308B may be consistent with any vent port as part of this disclosure. First vent path 312A and second vent path 312B may be consistent with any vent path as part of this disclosure. Venting path 312A and B may include a deflector to direct the flow of the battery ejecta. Deflector 328A and B are shown in FIG. 3. Deflectors 328A and 328B may be consistent with any deflectors discussed as part of this disclosure. First outlet 316A and second outlet 316B may be consistent with any outlet as part of this disclosure. Outlet 316A and 316B may allow battery ejecta to flow out of the aircraft from the bottom of the aircraft, in a downward direction. In between electrochemical cell 304A and 304B, there may reside a barrier 320. Barrier may be consistent with any barrier discussed in this disclosure. Barrier may prevent thermal runaway events from cascading from one cell to another. Vent path 312A and 312B may run through a crush zone 324 located below the electrochemical cells. Crush zone 324 may be consistent with any crush zone as part of this disclosure.

With continued reference to FIG. 3, In some embodiments, a vent path may be shared among electrochemical cells. An embodiment of this is illustrated in FIG. 3 as shared vent path 332. In some embodiments, shared vent path 332 may include a shared conduit. In some embodiments, shared vent path 332 may be connected to at least two electrochemical cells of the plurality of electrochemical cells. In some embodiments, wherein shared vent path 332 includes a conduit, shared conduit may be connected to at least two electrochemical cells of the plurality of electro chemical cells. Shared vent path 332 may help vent battery ejecta from two or more electrochemical cells of the plurality of electrochemical cells. In some embodiments, shared vent path 332 may include one or more deflectors. As non-limiting examples, shared vent path 332 may be connected to 3 electrochemical cells, 4 electrochemical cells, 6 electrochemical cells, or, more than 6 electrochemical cells.

Figure 4:
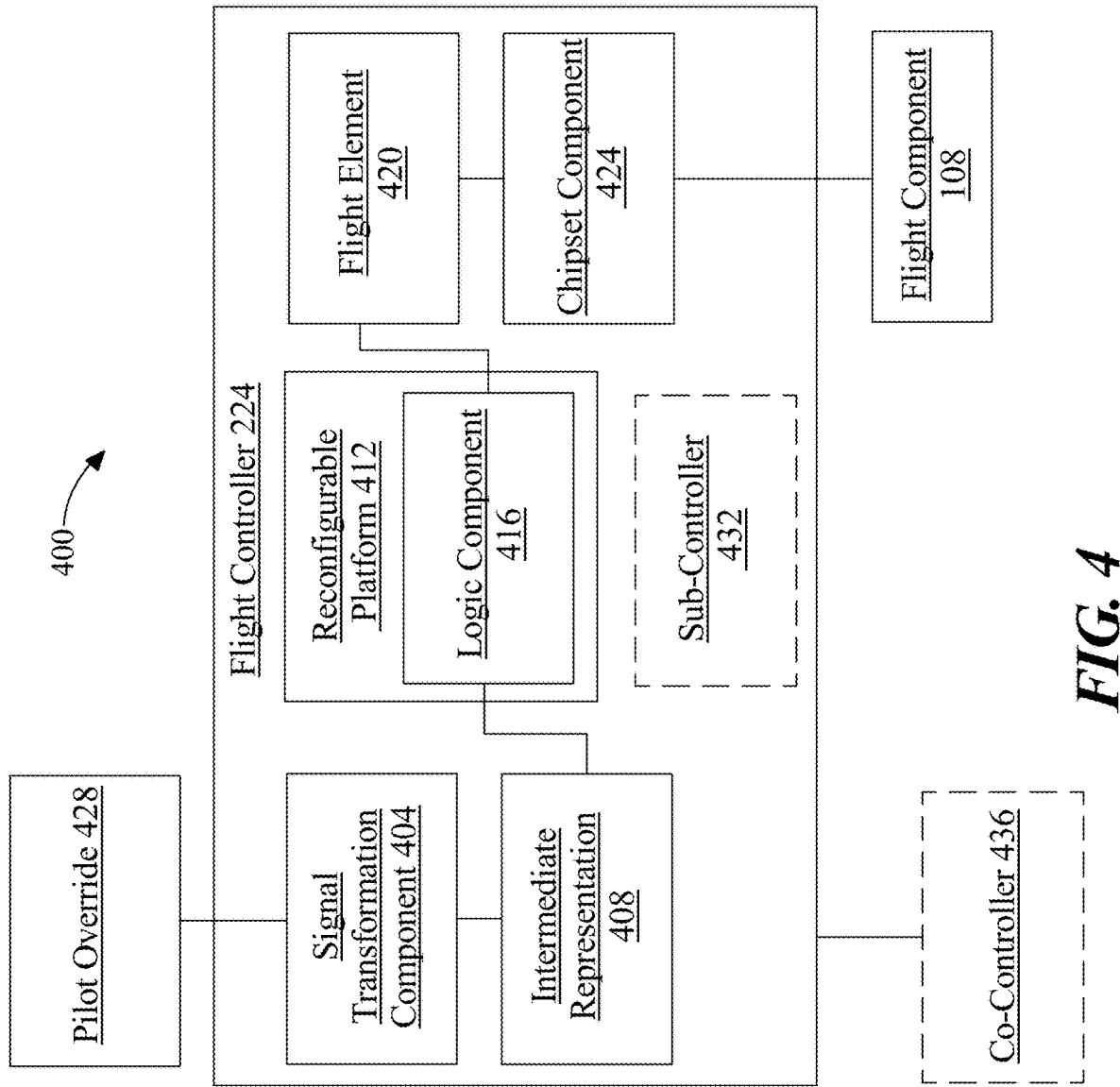
FIG. 4 is a block diagram of an exemplary embodiment of a flight controller.

Now referring to FIG. 4, an exemplary embodiment 400 of a possible computing device is illustrated. Thus, a flight controller is illustrated. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control the aircraft remotely, and/or may include an element installed in aircraft and a remote element in communication therewith.

In an embodiment, and still referring to FIG. 4, flight controller may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Pack (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

With continued reference to FIG. 4, in an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller may include a chipset component 428. As used in this disclosure a "chipset component" is a component that manages data flow. In an embodiment, and without limitation, chipset component 428 may include a northbridge data, wherein the northbridge data may manage data flow from logic component 420 to a high-speed device and/or component, such as a RAM, graphics controller, and the like thereof. In another embodiment, and without limitation, chipset component 428 may include a southbridge data venting path, wherein the southbridge data may manage data flow from logic component 420 to lower-speed peripheral buses, such as a peripheral component interconnect (PCI), industry standard architecture (ICA), and the like thereof. In an embodiment, and without limitation, southbridge data venting path may include managing data flow between peripheral connections such as ethernet, USB, audio devices, and the like thereof. Additionally or alternatively, chipset component 428 may manage data flow between logic component 420, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may include one or more ailerons. As a further example, flight component 108 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller may generate autonomous function as a function of an autonomous machine-learning model. Training data is used to train autonomous machine-learning model; training data may be stored in a database or based on expert input. Training data may include an input of the charge of the batteries and an output of whether they need to be charged. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller to control and/or maintain a portion of aircraft, a portion of the flight plan, the entire aircraft, and/or the entire flight plan. As a further non-limiting example, pilot signal 436 may include an implicit signal, wherein flight controller detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller and/or a remote device may or may not use in the generation of autonomous function. As used in this disclosure, "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be included of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller as components and/or nodes of a distributer flight controller as described above. For example, and without limitation, co-controller 444 may include one or more controllers and/or components that are similar to flight controller. As a further non-limiting example, co-controller 444 may include any controller and/or component that joins flight controller to distributer flight controller. As a further non-limiting example, co-controller 444 may include one or more processors, logic components and/or computing devices capable of receiving, processing, and/or transmitting data to and/or from flight controller to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
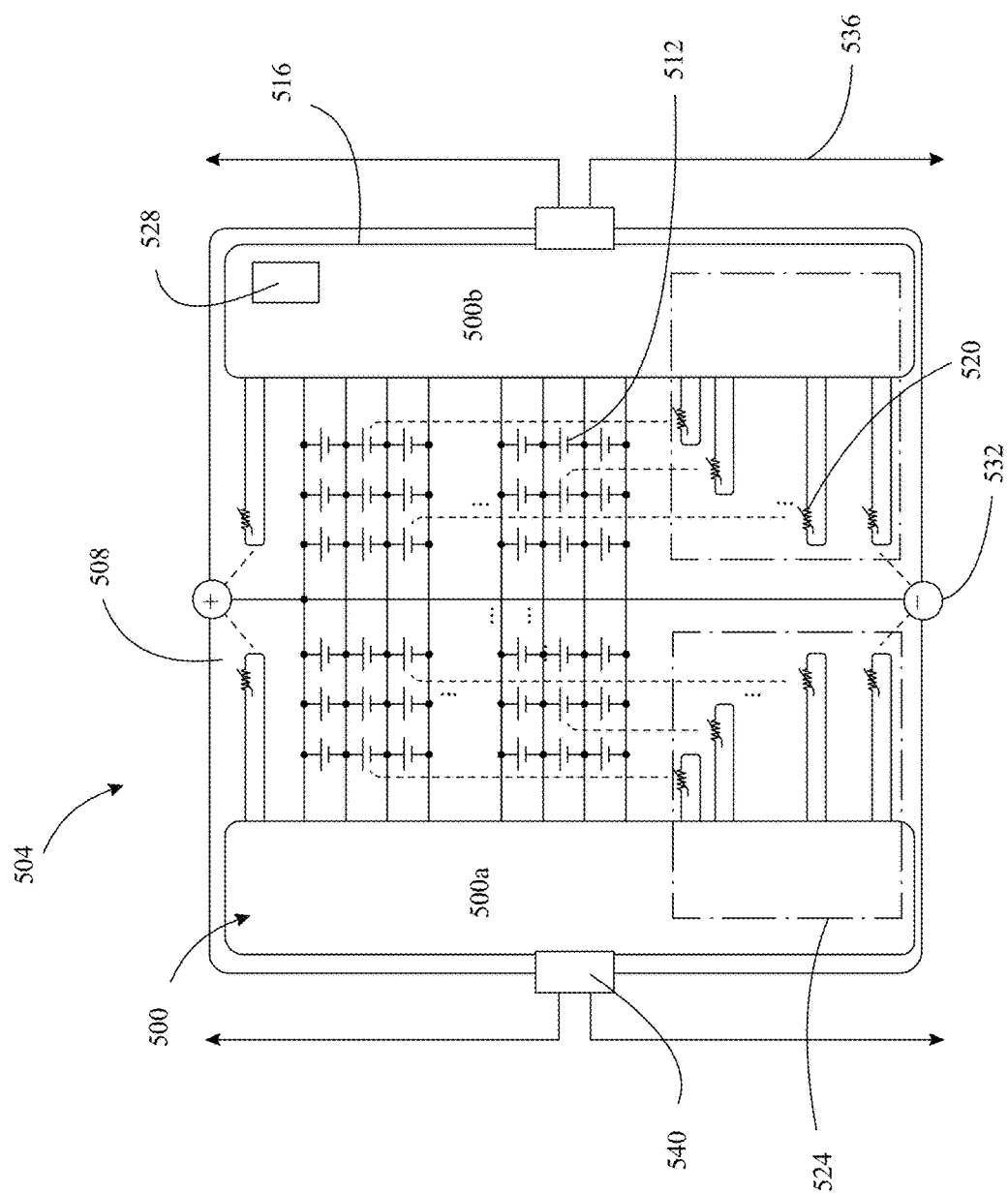
FIG. 5 is a block diagram of an exemplary embodiment of a module monitor unit in one or more aspect of the present disclosure.

Referring now to FIG. 5, an exemplary embodiment of a module monitor unit (MMU) 500 is presented in accordance with one or more embodiments of the present disclosure. MMU 500 may be consistent with any MMU as described in the entirety of this disclosure such as, but not limited to, MMU 104. In one or more embodiments, MMU 500 is configured to monitor an operating condition of a battery pack 504. For example, and without limitation, MMU 500 may monitor an operating condition of a battery module 508 and/or a battery cell 512 of battery pack 504. For instance and without limitation, battery module 508 may be consistent with any battery module as described herein such as, but not limited to, battery module 108. In one or more embodiments, MMU 500 may be attached to battery module 508, as shown in FIG. 5. For example, and without limitation, MMU 200 may include a housing 516 that is attached to battery module 508, where circuit of MMU 500 may be disposed at least partially therein, as discussed further in this disclosure. In one or more embodiments, a housing may include a polymer, stainless steel, carbon steel, fiberglass, and polycarbonate. In other embodiments, MMU 500 may be remote to battery module 508.

In one or more embodiments, a plurality of MMUs 500 may be configured to monitor battery module 508 and/or battery cell 512. For instance, and without limitation, a first MMU 500a may be position at one end of battery module 508, and a second MMU 500b may be positioned at an opposing end of battery module 508. This arrangement may allow for redundancy in monitoring of battery cell 512. For example, and without limitation, if first MMU 500a fails, then second MMU 500b may continue to work properly and monitor the operating condition of each battery cell 512 of battery module 508. In one or more embodiments, MMU 500 may monitor the operating condition of a plurality of battery cells, as shown in FIG. 5.

In one or more embodiments, MMU 500 is configured to detect a measurement parameter of battery module 508. For the purposes of this disclosure, a "measurement parameter" is detected electrical or physical input, characteristic, and/or phenomenon related to a state of battery pack 504 and/or components thereof. For example, and without limitation, a measurement parameter may be a temperature, a voltage, a current, a moisture level/humidity, a gas level, or the like, as discussed further in this disclosure. In one or more embodiments, MMU 500 may be configured to perform cell balancing and/or load sharing during the charging of battery pack 504. Cell balancing may be used when a battery module includes a plurality of battery cells 512. Cell unbalance includes variances in charge and discharge of each battery cell depending on an operating condition of each battery cell 512. Cell unbalance may result in damage, such as degradation or premature charge termination, of a battery cell. For example, a battery cell with a higher SOC than other battery cells may be exposed to overvoltage during charging. Cell balancing may include compensating for a variance in SOC, internal impedance, total chemical capacity, or the like. For instance, MMU 500 may perform cell balancing for SOC and thus regulate voltage input of battery cells 512. For instance, and without limitation, charging of battery pack 504 may be shared throughout a plurality of battery cells 512 by directing electrical power through balance resistors and dissipating voltage through resistors as heat. For example, and without limitation, resistor may include a nonlinear resistor, such as a thermistor 520. Thermistor 520 may be configured to provide cell balancing by reducing a voltage supplied to a battery cell of the battery module. The reduction in the voltage supplied to the battery cell may be achieved via heat dissipation. In one or more non-limiting embodiments, MMU 500 may detect the charge of each battery and thermistors 520 of MMU 500 may be configured to reduce a current and/or voltage supplied to a battery cell 512 as a function of a temperature of the thermistor. For example, and without limitation, if a battery cell is being overcharged then the temperature of the connected circuit and thermistor may also experience and increase in temperature; as a result the thermistor may increase in resistance and a fraction of the supplied voltage across the thermistor will also change, which results in a decrease in voltage received by the battery cell. In this manner, battery cells 512 may be charged evenly during recharging and/or charging of battery pack 504 by, for example, a charging station or an electric grid. For example, and without limitation, battery cells with a lower SOC will charge more than battery cells with a greater SOC by thermistors 520 dissipating voltage to the battery cells with the greater SOC. In one or more embodiments, cell balancing may be equally distributed, where each battery cell receives an equal amount of electricity depending on how many amps are available from the charger and how many cells need to be charged. For example, and without limitation, a current may be equally distributed to each battery cell by MMU 500. In another embodiment, MMU 500 may detect an SOC of each battery cell and distribute current to each battery cell in various amounts as a function of the detected SOC of each battery cell. For example, and without limitation, MMU may detect that a first battery cell has an SOC of 20% and a second battery cell has as SOC of 80%. During recharging, the current and/or voltage to the first battery may be increased so that first battery cell is charged faster than the second battery cell. In one or more non-limiting embodiments, once first battery cell is at the same SOC as the second battery cell during recharging, distribution of current and/or voltage to each battery cell may be adjusted again so that the first battery cell and the second battery cell receive an equal charge.

With continued reference to FIG. 5, in a non-limiting embodiment, MMU 500 is configured to monitor a temperature of battery module 508. For example, MMU 500 may include a sensor 524 configured to detect a temperature parameter of battery cell 512. Sensor 524 may be consistent with any senor as described in the entirety of this disclosure. For example, and without limitation, sensor 524 may include thermistor 520, which may be used to measure a temperature parameter of battery cell 512. As used in this disclosure, a thermistor includes a resistor having a resistance dependent on temperature. In one or more embodiments, sensor 524 may include circuitry configured to generate an MMU datum correlated to the detected measurement parameter, such as a temperature of battery cell 512 detected by thermistor 520. An "MMU datum," as used in this disclosure, is a collection of information describing the measurement parameters of battery cell 512. The MMU datum may include any data describing the functionality, quality, and performance of MMU 500 and/or sensor 524. In a non-limiting embodiment, MMU 500a and MMU 500b may generate their respective MMU datums. This is so, at least in part, to compare the MMU datum measured by MMU 500a and the MMU datum measured by MMU 500b. In a non-limiting embodiment, the comparison may indicate one or more discrepancies related to the measurement parameters which may further indicate some thermal event. A thermistor may include metallic oxides, epoxy, glass, and the like. A thermistor may include a negative temperature coefficient (NTC) or a positive temperature coefficient (PTC). Thermistors may be beneficial do to being durable, compact, inexpensive, and relatively accurate. In one or more embodiments, a plurality of thermistors 520 may be used to provide redundant measuring of a state of battery cell 512, such as temperature. In other embodiments, MMU 500 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 520 may detect a temperature of battery cell 512. Subsequently, MMU 500 may generate a sensor signal output containing information related to the detected temperature of battery cell 512. In one or more embodiments, sensor signal output may include the MMU datum containing information representing a detected measurement parameter.

Still referring to FIG. 5, sensor 524 may include a sensor suite 500 (shown in FIG. 5) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 524 may be a contact or a non-contact sensor. For example, and without limitation, sensor 524 may be connected to battery module 508 and/or battery cell 512. In other embodiments, sensor 524 may be remote to battery module and/or battery cell 512. Sensor 524 may be communicatively connected to controller 320 of PMU 312 (shown in FIG. 3) so that sensor 524 may transmit/receive signals to/from controller 320, respectively, as discussed below in this disclosure. Signals, such as signals of sensor 524 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

In one or more embodiments, MMU 500 may include a control circuit that processes the received MMU datum from sensor 524, MMU 100a, and/or MMU 100b. In one or more embodiments, control circuit may be configured to perform and/or direct any actions performed by MMU 500 and/or any other component and/or element described in this disclosure. Control circuit may include any analog or digital control circuit, including without limitation a combinational and/or synchronous logic circuit, a processor, microprocessor, microcontroller, any combination thereof, or the like. In one or more embodiments, control circuit may be solely constructed from hardware; thus, control circuit may perform without using software. Not relying on software may increase durability and speed of control circuit while reducing costs. For example, and without limitations, control circuit may include logic gates and/or thermistors, as discussed further in this disclosure. In some embodiments, control circuit 528 may be integrated into MMU 500, as shown in FIG. 5. In other embodiments, control circuit 528 may be remote to MMU 500. In one or more nonlimiting exemplary embodiments, if the MMU datum of a temperature of a battery module 508, such as at a terminal 532, is higher than a predetermined threshold, control circuit 528 may determine that the temperature of battery cell 512 indicates a critical event and thus is malfunctioning. For example, a high voltage (HV) electrical connection of battery module terminal 532 may be short circuiting. If control circuit 528 determines that a HV electrical connection is malfunctioning, control circuit 528 may terminate a physical and/or electrical communication of the HV electrical connection to prevent a dangerous or detrimental reaction, such as a short, that may result in an electrical shock, damage to battery pack 504, or even a fire. Thus, control circuit 528 may trip a circuit of battery pack 504 and terminate power flow through the faulty battery module 508 until the detected fault is corrected and/or the excessively high temperature is no longer detected. Temperature sensors, such as thermistor 520 may assist in the monitoring of a cell group's overall temperature, an individual battery cell's temperature, and/or battery module's temperature, as just described above.

In one or more embodiments, MMU 500 may not use software. For example, MMU 500 may not use software to improve reliability and durability of MMU 500. Rather, MMU 500 may be communicatively connected to a remote computing device, such as computing device 800 of FIG. 7. In one or more embodiments, MMU 500 may include one or more circuits and/or circuit elements, including without limitation a printed circuit board component, aligned with a first side of battery module 508 and the openings correlating to battery cells 512. In one or more embodiments, MMU 500 may be communicatively connected to a remote processing module, such as a controller. Controller may be configured to perform appropriate processing of detected temperature characteristics by sensor 524. In one or more embodiments, controller  may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 508**. In these and other embodiments, controller may operate in conjunction with other components, such as, a memory component, where a memory component includes a volatile memory and/or a non-volatile memory.

In one or more embodiments, each MMU 500 may communicate with another MMU 500 and/or a controller via a communicative connection 536. Each MMU may use a wireless and/or wired connection to communicated with each other. For example, and without limitation, MMU 500a may communicate with an adjacent MMU 500a using an isoSPI connection. As understood by one skilled in the art, and isoSPI connection may include a transformer to magnetically connect and electrically isolate a signal between communicating devices. Persons skilled in the art, upon reviewing the entirety of this disclosure, will be aware of the various embodiments of communication in the context of sensors.

Figure 6:
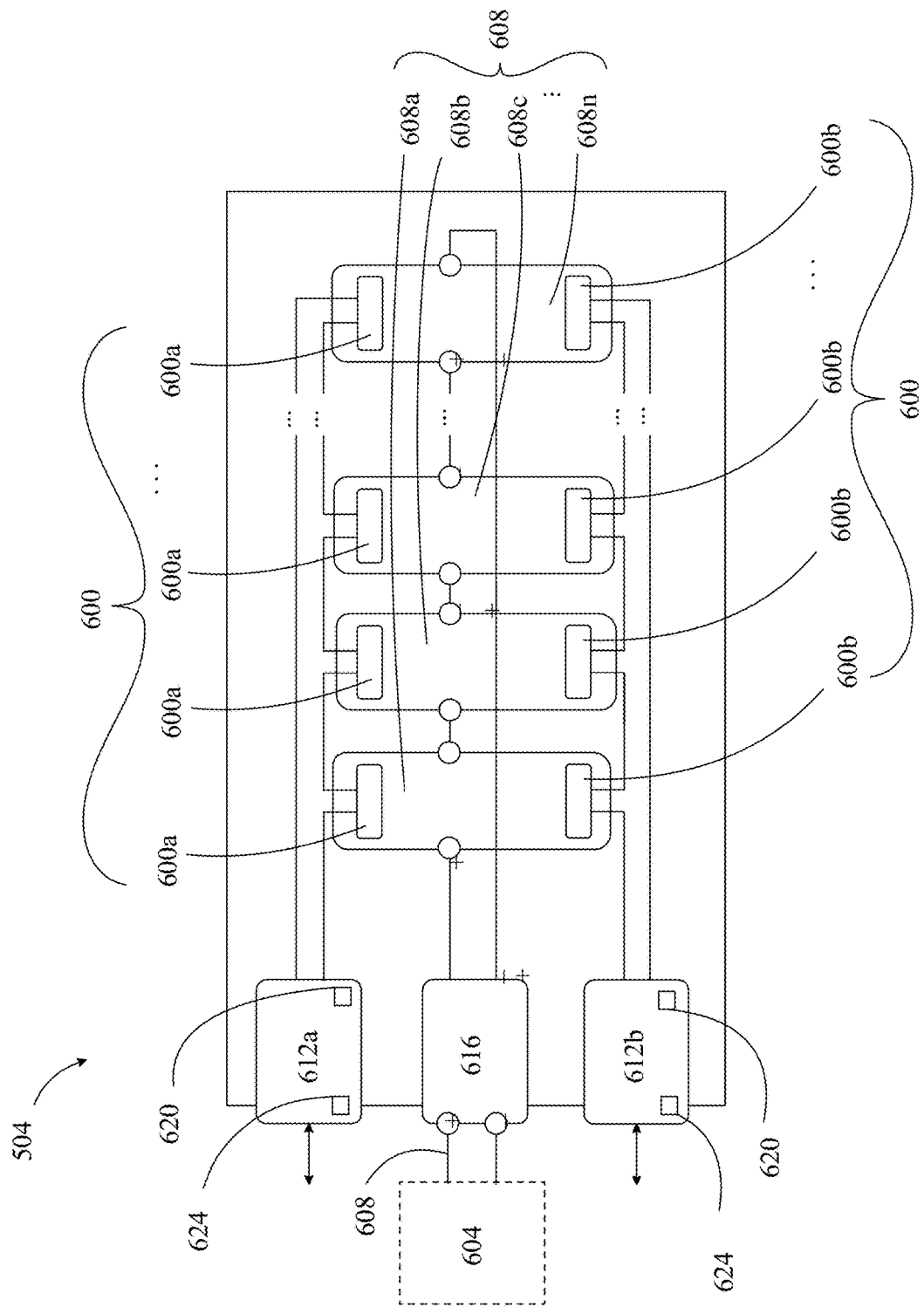
FIG. 6 is a block diagram of an exemplary embodiment of a battery pack in one or more aspects of the present disclosure.

Now referring to FIG. 6, a battery pack with a battery management component 600 that utilizes the MMU for monitoring a status of battery pack is shown in accordance with one or more embodiments of the present disclosure. The battery pack may be consistent with any battery back as described in the entirety of this disclosure. For instance and without limitation, the battery pack 504 may be consistent with the battery pack in U.S. patent application Ser. No. 17/529,447. In one or more embodiments, electric aircraft battery pack 504 may include a battery module 508, which is configured to provide energy to an electric aircraft 604 via a power supply connection 608. For the purposes of this disclosure, a "power supply connection" is an electrical and/or physical communication between a battery module 508 and electric aircraft 604 that powers electric aircraft 604 and/or electric aircraft subsystems for operation. In one or more embodiments, the battery pack may include a plurality of battery modules, such as modules 508a-n. For example, and without limitation, battery pack 504 may include fourteen battery modules. In one or more embodiments, each battery module 508a-n may include a battery cell 512 (shown in FIG. 2).

Still referring to FIG. 6, battery pack 504 may include a battery management component 520 (also referred to herein as a "management component"). In one or more embodiments, battery management component 600 may be integrated into battery pack 504 in a portion of battery pack 504 or a subassembly thereof. In an exemplary embodiment, and without limitation, management component 600 may be disposed on a first end of battery pack 504. One of ordinary skill in the art will appreciate that there are various areas in and on a battery pack and/or subassemblies thereof that may include battery management component 600. In one or more embodiments, battery management component 600 may be disposed directly over, adjacent to, facing, and/or near a battery module and specifically at least a portion of a battery cell. In one or more embodiments, battery management component 600 includes module monitor unit (MMU) 500, a pack monitoring unit (PMU) 612, and a high voltage disconnect 616. In one or more embodiments, battery management component 600 may also include a sensor 524. For example, and without limitation, battery management component 600 may include a sensor suite having a plurality of sensors, as discussed in this disclosure.

In one or more embodiments, MMU 500 may be mechanically connected and communicatively connected to battery module 508. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 500 is configured to detect a measurement characteristic of battery module 508 of battery pack 504. For the purposes of this disclosure, a "measurement characteristic" is detected electrical or physical input and/or phenomenon related to a condition state of battery pack 504. A condition state may include detectable information related to, for example, a temperature, a moisture level, a humidity, a voltage, a current, vent gas, vibrations, chemical content, or other measurable characteristics of battery pack 504, battery module 508, and/or battery cell 512. For example, and without limitation, MMU 500 may detect and/or measure a measurement characteristic, such as a temperature, of battery module 508. In one or more embodiments, a condition state of battery pack 504 may include a condition state of a battery module 508 and/or battery cell 512. In one or more embodiments, MMU 500 may include a sensor, which may be configured to detect and/or measure measurement characteristic. As used in this disclosure, a "sensor" is a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMU 500 is configured to transmit a measurement datum of battery module 508. MMU 500 may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of battery pack 504. In one or more embodiments, measurement datum may include temperature value, current value, voltage value, humidity level, pressure level, chemical/byproduct level, vent gas detection, and other information regarding detected characteristics. For example, measurement datum may include data of a measurement characteristic regarding a detected temperature of battery cell 512. In one or more embodiments, measurement datum may be transmitted by MMU 500 to PMU 612 so that PMU 612 may receive measurement datum, as discussed further in this disclosure. For example, MMU 500 may transmit measurement data to a controller 620 of PMU 612.

In one or more embodiments, MMU 500 may include a plurality of MMUs. For instance, and without limitation, each battery module 508a-n may include one or more MMUs 500. For example, and without limitation, each battery module 508a-n may include two MMUs 500a,b. MMUs 500a,b may be positioned on opposing sides of battery module 508. Battery module 508 may include a plurality of MMUs to create redundancy so that, if one MMU fails or malfunctions, another MMU may still operate properly. In one or more nonlimiting exemplary embodiments, MMU 500 may include mature technology so that there is a low risk. Furthermore, MMU 500 may not include software, for example, to avoid complications often associated with programming. MMU 500 is configured to monitor and balance all battery cell groups of battery pack 504 during charging of battery pack 504. For instance, and without limitation, MMU 500 may monitor a temperature of battery module 508 and/or a battery cell of battery module 508. For example, and without limitation, MMU may monitor a battery cell group temperature. In another example, and without limitation, MMU 500 may monitor a terminal temperature to, for example, detect a poor HV electrical connection. In one or more embodiments, an MMU 500 may be indirectly connected to PMU 612. In other embodiments, MMU 500 may be directly connected to PMU 612. In one or more embodiments, MMU 500 may be communicatively connected to an adjacent MMU 500.

Still referring to FIG. 6, battery management component 600 includes a pack monitoring unit (PMU) 528 may be connected to MMU 500. In one or more embodiments, PMU 612 includes a controller 620, which is configured to receive measurement datum from MMU 500, as previously discussed in this disclosure. For example, PMU 612a may receive a plurality of measurement data from MMU 500a. Similarly, PMU 612b may receive a plurality of measurement data from MMU 500b. In one or more embodiments, PMU 612 may receive measurement datum from MMU 500 via communicative connections. For example, PMU 612 may receive measurement datum from MMU 500 via an isoSPI communications interface. In one or more embodiments, controller 620 of PMU 612 is configured to identify an operating of battery module 508 as a function of measurement datum. For the purposes of this disclosure, an "operating condition" is a state and/or working order of battery pack 504 and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 620 of PMU 612 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to battery pack 504 and/or electric aircraft 604. For instance, and without limitation, if an identified operating condition, such as a temperature of a battery cell 512 of battery pack 504, does not fall within a predetermined threshold, such as a range of acceptable, operational temperatures of the battery cell, then a critical event element is determined by controller 620 of PMU 612. For example, and without limitation, PMU may use measurement datum from MMU to identify a temperature of 95 degrees Fahrenheit for a battery cell. If the predetermined threshold is, for example, 65 to 90 degrees Fahrenheit, then the determined operating condition is outside of the predetermined threshold, such as exceeding the upper temperature threshold of 90 degrees Fahrenheit, and a critical event element is determined by controller 620. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that battery pack 504 is working properly. For example, and without limitation, if an operating condition of temperature exceeds a predetermined threshold, then battery pack is considered to be operating at a critical operating condition and may be at risk of overheating and experiencing a catastrophic failure.

In one or more embodiments, controller 620 of PMU 612 is configured to generate an action command if critical event element is determined by controller 620. For the purposes of this disclosure, a "action command" is a control signal, which is an electrical signal and/or transmission that represents a control command. Continuing the previously described example above, if an identified operating condition includes a temperature of 95 degrees Fahrenheit, which exceeds a predetermined threshold, then controller 620 may determine a critical event element indicating that battery pack 504 is working at a critical temperature level and at risk of catastrophic failure. In one or more embodiments, critical event elements may include high shock/drop, overtemperature, undervoltage, high moisture, contactor welding, and the like.

In one or more embodiments, controller 620 may include a computing device (as discussed in FIG. 7), a central processing unit (CPU), a microprocessor, a digital signal processor (DSP), an application specific integrated circuit (ASIC), a control circuit, a combination thereof, or the like. In one or more embodiments, output signals from various components of battery pack 504 may be analog or digital. Controller 620 may convert output signals from MMU 500 and/or sensor 524 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 612 may run state estimation algorithms.

In one or more embodiments, MMU 500 may be implemented in battery management system 600 of battery pack 504. MMU 500 may include sensor 524, as previously mentioned above in this disclosure. For instance, and without limitation, MMU 500 may include a plurality of sensors. For example, MMU 500 may include thermistors 520 to detect a temperature of a corresponding battery module 508 and/or battery cell 512. MMU 500 may include sensor 520 or a sensor suite, such as sensor suite 500 of FIG. 2, that is configured to measure physical and/or electrical parameters of battery pack 504, such as without limitation temperature, voltage, current, orientation, or the like, of one or more battery modules and/or battery cells 512. MMU 500 may configured to generate a measurement datum of each battery cell 512, which a control circuit may ultimately use to determine a failure within battery module 508 and/or battery cell 512, such as a critical event element. Cell failure may be characterized by a spike in temperature and MMU 500 may be configured to detect that increase, which in turn, PMU 612 uses to determine a critical event element and generate signals, to disconnect a power supply connection between electric aircraft ** and battery cell 512 and to notify users, support personnel, safety personnel, maintainers, operators, emergency personnel, aircraft computers, or a combination thereof. In one or more embodiments, measurement data of MMU may be stored in memory component 624.

Still referring to FIG. 6, battery management component 600 may include high voltage disconnect 532, which is communicatively connected to battery module 508, wherein high voltage disconnect 532 is configured to terminate power supply connection 512 between battery module 508 and electric aircraft 604 in response to receiving action command from PMU 612. PMU 612 may be configured to determine a critical event element, such as high shock/drop, overtemperature, undervoltage, contactor welding, and the like. High voltage disconnect 532 is configured to receive action command generated by PMU 612 and execute a control operation as a function of the action command. For the purposes of this disclosure, a "control operation" is a performance of an action related to an action command. For example, and without limitation, high voltage disconnect may execute a control operation that includes a lock out of battery pack 504 for maintenance. In one or more embodiments, PMU 612 may create a lockout flag, which may be saved across reboots. A lockout flag may include an indicator alerting a user of termination of power supply connection 512 by high voltage disconnect 532. For instance, and without limitation, a lockout flag may be saved in a database od PMU 612 so that, despite rebooting battery pack 504 or complete loss of power of battery pack 504, power supply connection remains terminated and an alert regarding the termination remains. In one or more embodiments, lockout flag cannot be removed until a critical event element is no longer determined by controller 620. For, example, PMU 612 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack 504. In one or more embodiments, PMU 612 may include control of cell group balancing via MMUs, control of contactors (high voltage connections, etc.) control of welding detection, control of pyro fuses, and the like.

In one or more embodiments, battery management component 600 may include a plurality of PMUs 612. For instance, and without limitation, battery management component 600 may include a pair of PMUs. For example, and without limitation, battery management component 600 may include a first PMU 612a and a second PMU 612b, which are each disposed in or on battery pack 504 and may be physically isolated from each other. "Physical isolation", for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the non-limiting exemplary embodiment, first PMU 612a and second PMU 612b may perform the same or different functions. For example, and without limitation, the first and second PMUs 612a,b may perform the same, and therefore, redundant functions. Thus, if one PMU 612a/b fails or malfunctions, in whole or in part, the other PMU 612b/a may still be operating properly and therefore battery management component 600 may still operate and function properly for battery pack 504. One of ordinary skill in the art would understand that the terms "first" and "second" do not refer to either PMU as primary or secondary. In non-limiting embodiments, the first and second PMUs 612a,b, due to their physical isolation, may be configured to withstand malfunctions or failures in the other system and survive and operate. Provisions may be made to shield first PMU 612a from PMU 612b other than physical location, such as structures and circuit fuses. In non-limiting embodiments, first PMU 612a, second PMU 612b, or subcomponents thereof may be disposed on an internal component or set of components within battery pack 504, such as on battery module sense board, as discussed further below in this disclosure.

Still referring to FIG. 6, first PMU 612a may be electrically isolated from second PMU 612b. "Electrical isolation", for the purposes of this disclosure, refer to a first system's separation of components carrying electrical signals or electrical energy from a second system's components. First PMU 612a may suffer an electrical catastrophe, rendering it inoperable, and due to electrical isolation, second PMU 612b may still continue to operate and function normally, allowing for continued management of battery pack 504 of electric aircraft 604. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 612a,b, preventing electrical energy to be conducted through it, isolating the first and second PMUs 612a,b form each other.

With continued reference to FIG. 6, battery management component 600 may include memory component 624, as previously mentioned above in this disclosure. In one or more embodiments, memory component 624 may be configured to store datum related to battery pack 504, such as data related to battery modules 508a-n and/or battery cells 512. For example, and without limitation, memory component 624 may store sensor datum, measurement datum, operation condition, critical event element, lockout flag, and the like. Memory component 624 may include a database. Memory component 624 may include a solid-state memory or tape hard drive. Memory component 624 may be communicatively connected to PMU 612 and may be configured to receive electrical signals related to physical or electrical phenomenon measured and store those electrical signals as battery module data. Alternatively, memory component 624 may be a plurality of discrete memory components that are physically and electrically isolated from each other. One of ordinary skill in the art would understand the virtually limitless arrangements of data stores with which battery pack 504 could employ to store battery pack data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software packs may also include appropriate hardware for assisting in the implementation of the machine executable instructions of the software and/or software pack.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
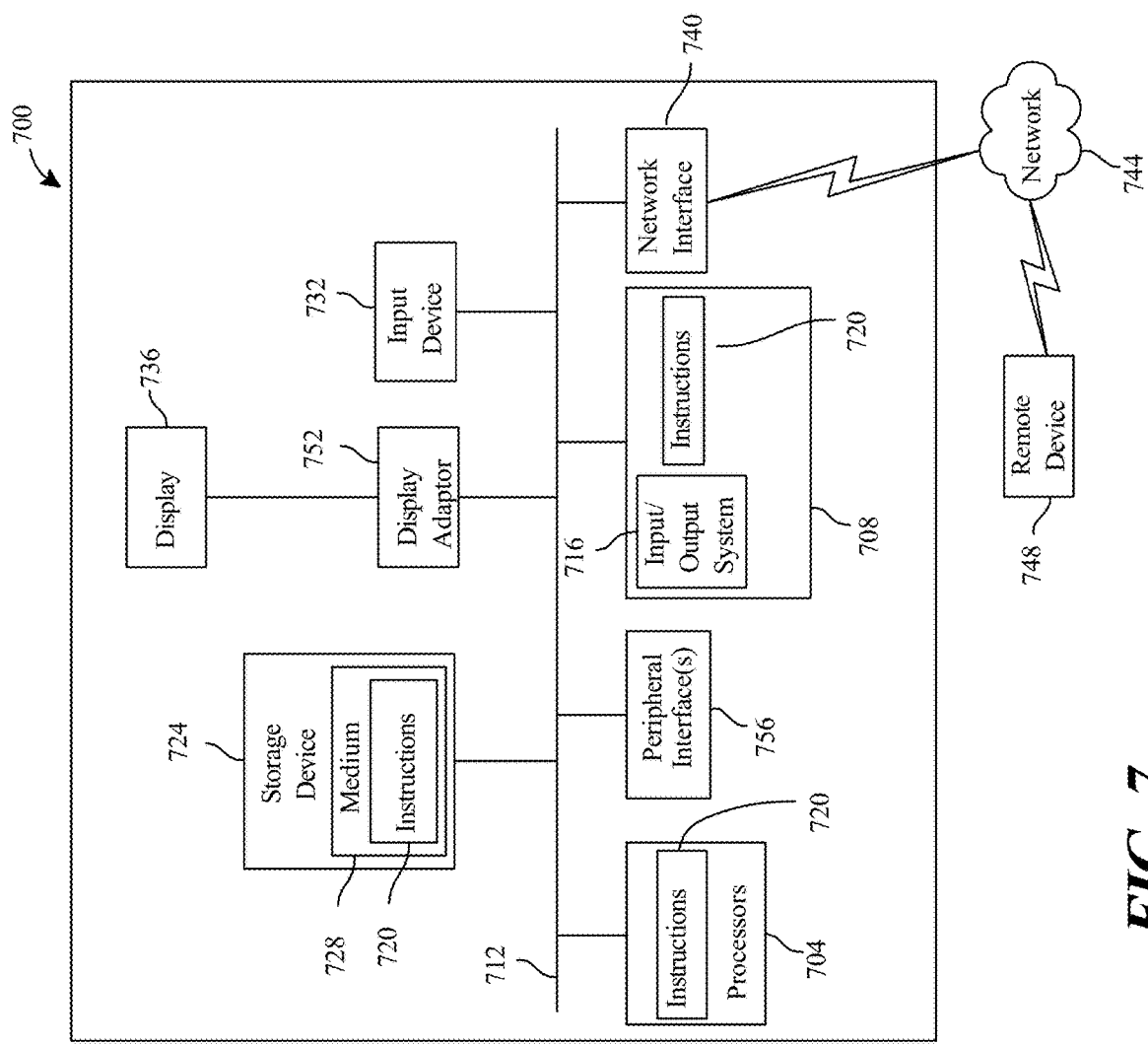
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Pack (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program packs including, but not limited to, an operating system, one or more application programs, other program packs, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program packs, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A venting apparatus for battery ejecta for use in an electric vertical takeoff and landing (eVTOL) aircraft, the apparatus comprising:
    a battery module, the battery module comprising a plurality of electrochemical cells, wherein the plurality of electrochemical cells are each separated by a carbon fiber barrier; and
    a plurality of vent ports connected to the plurality of electrochemical cells and configured to vent the plurality of electrochemical cells using a plurality of venting paths and at least an outlet, wherein the plurality of vent ports are fluidly connected to the plurality of venting paths and the plurality of vent ports include a plurality of motion sensors to detect a thermal runaway event and the plurality of venting paths are fluidly connected to at least an outlet, wherein the plurality of motion sensors are configured to measure the same data at different instances;
    a controller, wherein the controller commands an actuator to control the plurality of venting paths and change a plurality of angles of the plurality of vent ports.

2. The venting apparatus of claim 1, wherein the plurality of venting paths comprises a conduit.

3. The venting apparatus of claim 2, wherein the conduit is fluidly connected to the plurality of electrochemical cells.

4. The venting apparatus of claim 1, wherein each of the plurality of venting ports comprises a check valve.

5. The venting apparatus of claim 1, wherein the at least an outlet is located on the bottom of the electric aircraft.

6. The venting apparatus of claim 1, wherein the plurality of venting paths comprise deflectors to direct battery ejecta away from the battery module.

7. The venting apparatus of claim 6, wherein the deflectors direct battery ejecta downward of the electric aircraft.

8. The venting apparatus of claim 6, wherein the deflectors direct battery ejecta away from the passengers located in the electric aircraft.

9. The venting apparatus of claim 1, wherein the plurality of venting paths include a crush zone.

10. The venting apparatus of claim 9, wherein the crush zone comprises a material configured in a honeycomb pattern.

11. The venting apparatus of claim 1, wherein the plurality of venting paths is composed of a temperature-resistant material.

12. The venting apparatus of claim 1, further comprising a pneumatic system, the pneumatic system configured to maneuver a plurality of vent ports.

13. The venting apparatus of claim 12, wherein the pneumatic system comprises at least the actuator, wherein the actuator is configured to maneuver the plurality of vent ports.

14. The venting apparatus of claim 1, wherein a vent port of a plurality of vent ports includes an individual maneuverable component.

15. The venting apparatus of claim 14, wherein the individual maneuverable component is controlled by a flight controller.

16. The venting apparatus of claim 1, further comprising a temperature sensor communicatively connected to a module monitoring unit.

17. The venting apparatus of claim 16, wherein the temperature sensor is configured to detect a temperature datum of an electrochemical cell.

18. The venting apparatus of claim 14, wherein the individual maneuverable component may be controlled as a function of the temperature sensor.

19. The venting apparatus of claim 1, wherein the electric aircraft is an electric vertical takeoff and landing aircraft.

20. The venting apparatus of claim 2, wherein the conduit is connected to at least two electrochemical cells of the plurality of electrochemical cells.

* * * * *